Sept. 2, 1958 K. O. SCHNEIDER ET AL 2,850,202
OUTLET BOX AND METHOD OF MANUFACTURE OF THE SAME
Filed March 14, 1956 2 Sheets-Sheet 1
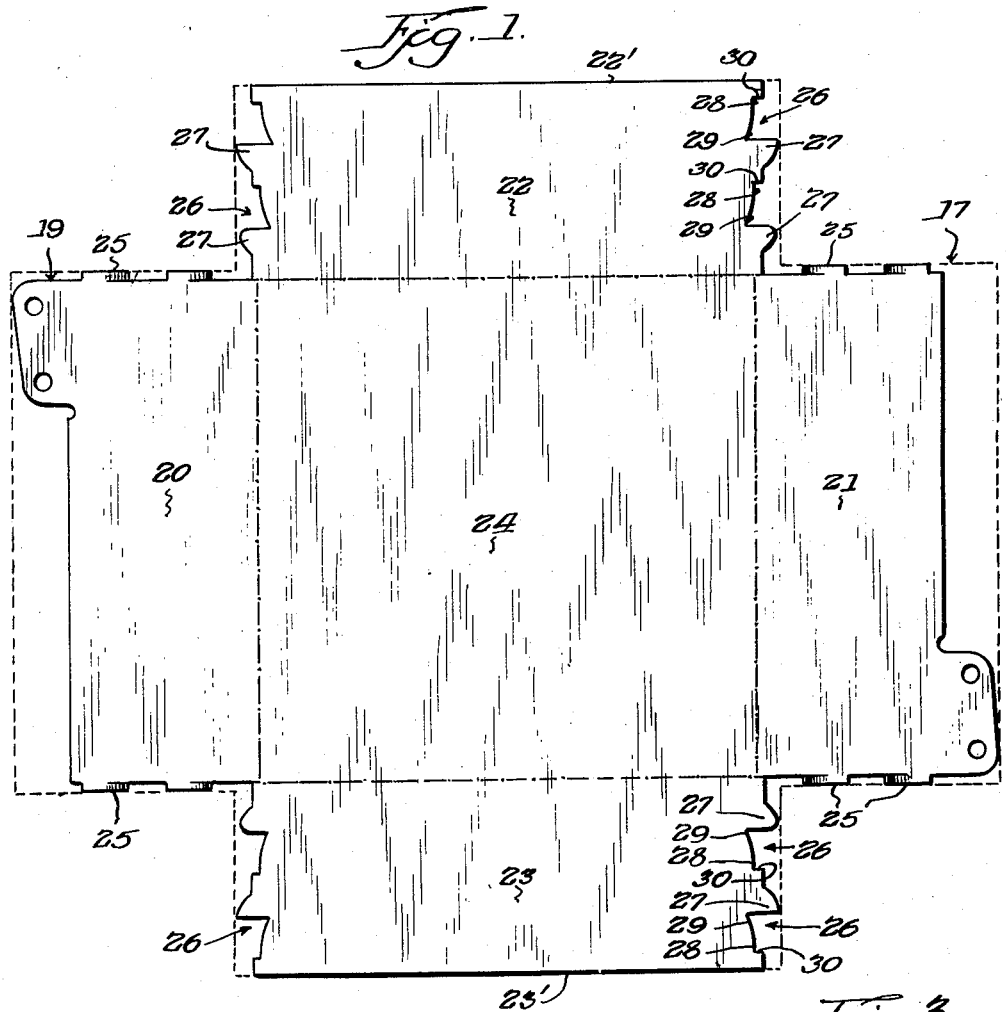
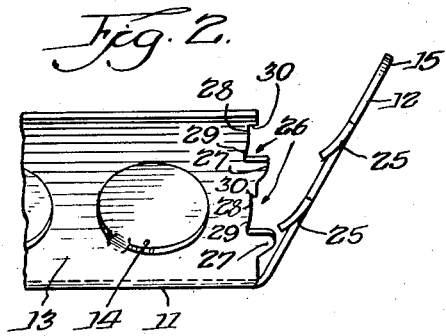
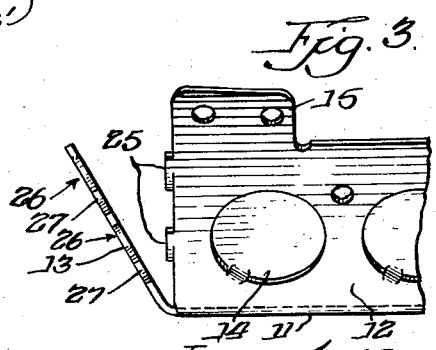
Inventors.
Kenneth O. Schneider, &
Alfred Wermuth.
By Carlson, Pitzner, Hubbard & Wolfe
Attys.

Sept. 2, 1958   K. O. SCHNEIDER ET AL   2,850,202
OUTLET BOX AND METHOD OF MANUFACTURE OF THE SAME
Filed March 14, 1956   2 Sheets-Sheet 2
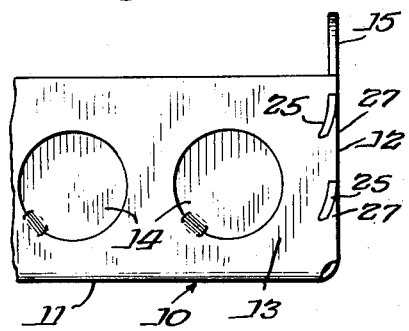
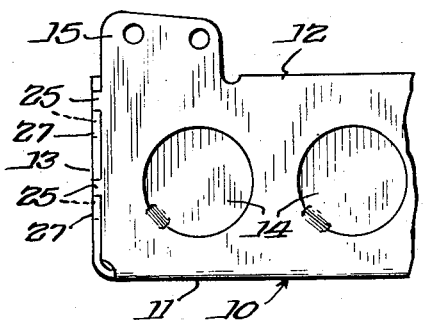
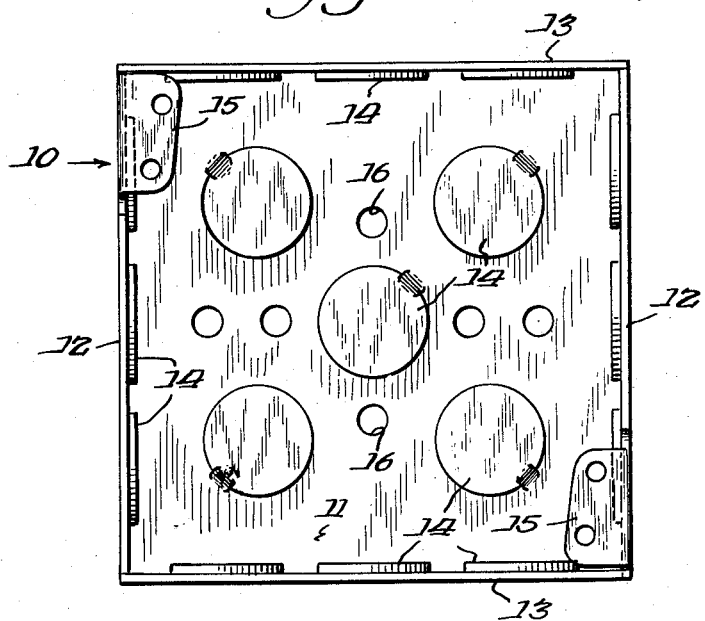
Inventors
Kenneth O. Schneider, &
Alfred Wermuth.
By Carlson, Pitzner, Hubbard & Wolfe
Attys.

United States Patent Office 2,850,202
Patented Sept. 2, 1958

2,850,202

OUTLET BOX AND METHOD OF MANUFACTURE OF THE SAME

Kenneth O. Schneider, Roselle, and Alfred Wermuth, Chicago, Ill., assignors to Appleton Electric Company, Chicago, Ill., a corporation of Illinois Application March 14, 1956, Serial No. 571,391

6 Claims. (Cl. 220—62)

This invention relates generally to an electrical outlet box and the method of manufacture of this box, and more particularly, to an electrical outlet box fabricated by stamping and forming sheet material as distinguished from a box made by drawing sheet material.

It is an object of this invention to provide an electrical outlet box formed from a blank of sheet material, commonly sheet metal, characterized by a corner construction of great strength obtained by an interlock between adjacent marginal edges of the blank.

It is a further object to provide an electrical outlet box with edged joints having a smooth finished appearance and where the joint construction is secured by interlocking scalloped edges of the walls which bound the box.

Another object is to provide a method of making the outlet box from sheet material, by blanking, trimming the abutting marginal edges of the flat blank which are to form the corners of the finished box, and in a single operation forming the blank to produce the finished rectangular configuration of the box and by swaging the abutting edges of the blank, obtaining a permanent interlock at the corner joints.

The objects of the invention thus generally set forth, together with other objects and ancillary advantages are attained by the construction and arrangement shown by way of illustration in the accompanying drawings, in which:

Figure 1 illustrates the blank from which the outlet box of the invention is formed;

Fig. 2 illustrates the outlet box as it would appear during the forming operation, where the walls are being bent acutely to the bottom of the box;

Fig. 3 is a view similar to Fig. 2, but taken with the partially formed outlet box shifted 90° from the position in which it appears in Fig. 2;

Fig. 4 is a view of the box with the walls of the box now formed at right angles to the bottom of the box and the abutting edges swaged and interlocked;

Fig. 5 is a view similar to Fig. 4 but taken with the ountlet box shifted 90° from the position in which it appears in Fig. 4; and Fig. 6 is a top plan view of the completed box.

While the invention is susceptible of various modifications, there is shown in the drawings and will herein be described in detail, a preferred form of both the method and the article of this invention. It is to be understood, however, that it is not thereby intended to limit the invenion to the specific form disclosed. On the contrary, it is intended to cover all modifications, alternative constructions, and equivalents falling within the spirit and scope of the invention as expressed in the appended claims.

Referring to Figs. 1 and 6, in the form of the invention illustrated, the box 10 is made from thin gauge sheet material, ordinarily sheet steel, blanked as shown in Fig. 1 and then bent to the final configuration. A square box is shown, although it is to be understood an oblong or other shape may be employed if desired.

The box 10 thus has a rectangular bottom 11 and rectangular side and end walls 12, 13 respectively, with knockouts 14 in the walls for connecting cable or electrical conduit to the box. Ears 15 are provided as in the ordinary junction or outlet box, carried diagonally opposite on the top of the box, to serve for mounting a cover plate (not shown) to close the open face of the box. To mount the box on stud supports or the like the bottom, side and end walls of the box 10 are pierced with suitable mounting holes 16.

Permanent tight edged joints for the outlet box 10 are obtained by interlocking abutting vertical edges of the walls bounding the box. Accordingly, in the description to follow, the manner of fabrication of the outlet box is set forth in particular detail, both to enable a full and complete understanding of the method of making the box and to facilitate examination of the structural features of the finished article.

The successive operations required to produce the finished box and comprising an illustrative example of the method of this invention may be carried out in a progressive die in a single press or in separate dies in different presses, as desired, and as may be preferred to effect economies or to utilize machinery or factory space in keeping with production requirements or factory conditions. However, no matter whether a single press and progressive die or different presses and separate dies are employed in the manufacturing process, the method of this invention may be considered to involve a series of steps essentially including blanking, where strip steel is punched to produce a blank having the desired contour; trimming, where the blank is finished in such a way as to provide a series of interfitting and interlocking projections on adjacent edges which are to ultimately form the corners of the finished box; and forming, where the box is completed by bending the blank to the final box configuration and simultaneously swaging the edges to produce the finished corner construction.

Accordingly, as a first step in the manufacture of the outlet box, thin gauge strip steel is punched to produce a cruciform blank 17 having an uninterrupted outline as shown by the dotted line extending about the periphery of the blank depicted in Fig. 1. The cruciform blank 17 is oversize as compared with the trimmed blank 19 defined by the solid line of this figure. One pair of arms 20, 21 of the cruciform blank 17 is adapted when trimmed to form the side and the other pair 22, 23 the end walls of the finished box while the central portion 24 of the blank, as defined by the dot-dash square, forms the bottom of the box.

If in production a progressive die is employed, successive blanks will be joined along the edges 22′, 23′ and may be separated later in the manufacturing process. As shown in the drawings the blank 17 has already been cut off and is ready for the next operation in a separate press.

At this stage of manufacture, the oversize cruciform blank 17 is ready to be trimmed to its final outline 19.

In producing the final contour of the blank, the opposite arms 20, 21 are trimmed along the lateral marginal edges thereof to provide a series of lugs 25 which in this same operation, may also be formed and struck out of the blank so that the lower ends of the lugs as shown in Fig. 2, project arcuately out of the plane of the blank and toward the inside of the box.

Preferably with the same die employed to trim the opposite arms 20, 21 of the blank 19, in the lateral marginal edges of the other pair of arms 22, 23 of the blank a series of notches 26 are cut or scalloped. These notches 26 are adapted to receive the arcuate lugs 25 and each notch is provided with a companion projection or flange 27 to interlock with the arcuate lugs 25 in forming the box corners. Accordingly, the notches 26 are formed with a shallow end 28 and a deep end 29 joined by an inside edge conforming substantially to the arcuate curve of the lugs 25 as shown in Figs. 2 and 3. Furthermore, the notches are recessed in the edge of the blank sufficiently to form a shoulder 30 at the shallow ends of the notches substantially as wide as the sheet metal blank is thick. Thus the edge portion of the blank adjacent the shoulder 30 in the completed box lies flush with the outside surface of the box and is of such a length as to match the spacing of the lugs 25, filling the spaces between the lugs and providing a smooth finished corner. The lower ends of the arcuate lugs 25 extending, as described hereinbefore, out of the plane of the blank, are received in the deep ends of the notches 26 where they are locked in place by metal provided by swaging the flanges 27 over the lugs.

During the blanking and trimming operations, the knockouts 14 may be outstruck, and the mounting holes 16 and the holes in the ears 15 may be pierced in the blank. Furthermore, the ends of the opposite arms 20, 21 may be trimmed to remove excess material bordering the ears 15, although a separate operation may be deemed necessary or desirable, to reduce in complexity the dies employed in forming the completed blank. From the trimming operation a completed and trimmed blank is obtained ready for the forming operation to bend the blank to the final configuration.

As hereinbefore described, the lugs on the lateral edges of the opposite arms 20, 21 are struck to project partially out of the plane of the blank prior to bending the blank to produce the final box configuration. The lugs are given arcuate form in order to condition the adjacent marginal edges of the blank which are ultimately to meet and form the corners of the finished box, for interlocking together. As described hereinbefore, the operation on the lugs may be performed in the same die used to trim the oversize blank to its final contour. Alternatively, a separate operation may be used, however in the interest of economy of manufacture and to reduce the number of steps required to produce the finished box, it is desirable to include this forming operation as part of the trimming operation, just as it is desirable from a production standpoint in the same operation to place the knockouts and mounting holes in the blank.

The finished blank, trimmed to the contour shown in Fig. 1, and with the lugs 25 formed as shown in Figs. 2 and 3, is then bent to form the box. The blank may be formed by following conventional practice, in a press where the male and female parts of the die are reversed. With this arrangement the form punch, or male part of the die, is located on the bed of the machine, while the die cavity, the female part of the die, is carried by the ram. The parts of the die may, as well, include a shear for cutting off the successive blanks when a progressive die is used in the manufacture of the box. Where separate presses and separate dies are used, the successive blanks from the sheet metal strip may be cut off in the first blanking operation.

In the forming operation, as the ram is driven down toward the bed of the machine, the shear operates to cut off the individual cruciform blanks. As the ram forces down further, the form punch enters the die cavity and the side and end walls of the box are bent with respect to the bottom of the box. As shown in Figs. 2 and 3, the adjacent edges of the blank are constructed so that during the bending operation, as the side and end walls approach the right angle relation with respect to the bottom of the box, the arcuate lugs 25 on the lateral edges of the side walls of the box enter the complementary shaped notches 26 on the edges of the end walls of the box. Furthermore, the punch working in the die cavity swages the projections or flanges 27 adjacent the deep ends of the notches 26 in over the lugs, filling the notches with the flowing metal. Sufficient material is provided by the projections or flanges 27 to fill the notches and provide a clean square outline for the box corners. The interlock thus produced obtains a permanent tight edged joint at each corner of the finished box, as shown in Figs. 4 and 5 which depict the article in this stage of manufacture.

For ease in manufacture, the ears 15 as shown in Figs. 4 and 5 remain in the plane of the side walls until the box has been completely formed. Accordingly, as a final step, the ears 15 are bent to lie parallel with the bottom of the box as shown in Fig. 6.

By following the method of manufacture of this invention, an electric outlet box with edged joints of great strength is provided. Furthermore, the clean dovetailed corners and the smooth configuration of the box facilitate the handling and installation of the box. Due to the absence of jagged edges the risk of snagging electrical wires while connecting into the box, or for that matter the risk of injury from snagging fingers, is completely eliminated. At the same time substantial economies can be effected in the manufacture of the box of this invention, as distinguished from the ordinary drawn box. Heavy drawing equipment is expensive, while the dies required in the fabrication of the box of this invention may be made relatively inexpensively.

As hereinbefore noted, close dimensional accuracy can be obtained not only in the location of the knockouts and the mounting holes in the box, but as well the final dimensions of the box can be held within close tolerances. As will be evident, the number of operations required to complete the finished box may be kept to a minimum. Thus, a quality outlet box may be produced at minimum cost, characterized by its rugged construction and functional appearance.

We claim as our invention:

1. The method of making an electrical outlet box, said box having a bottom, side and end walls with knockouts therein, which comprises blanking a cruciform from a sheet metal strip where one pair of opposite arms is adapted to form the side and the other pair the end walls of the finished box, and the central portion of the cruciform the bottom of the finished box, trimming the blank to form along the lateral marginal edges of said one pair of arms arcuate lugs projecting out of the plane of the blank, and along the lateral marginal edges of the other pair of arms complementary shaped notches having flanges formed adjacent one side of the notches, and forming the box by bending the arms of the blank at right angles to the central portion, simultaneously causing the arcuate lugs to enter the complementary shaped notches and swaging the flanges into the notches over the lugs to interlock therewith and obtain permanent tight edged joints for the box.

2. The method of making an electrical outlet box from sheet material, said box having a rectangular bottom and rectangular side and end walls with knockouts therein, which comprises blanking a cruciform from the sheet material where one pair of opposite arms is adapted to form the side and the other pair the end walls of the finished box, and the central portion of the cruciform the bottom of the finished box, trimming the blank to form in a series of marginal edges thereof lugs each having a portion projecting out of the plane of the blank and in adjacent marginal edges which are to form therewith the corners of the finished box complementary shaped notches, each notch having a companion projection adapted to interlock with the lugs to obtain permanent tight edged joints for the box, and forming the box by bending the arms of the blank at right angles to the central portion, causing the projecting portions of the lugs to enter the complementary shaped notches, and swaging the projections into the notches over the lugs to interlock therewith.

3. An electrical outlet box having a bottom, and side and end walls bent up from the bottom and bounding the box, where the walls meet in permanent tight edged joints formed by arcuate lugs carried on the edge of one wall struck to project partially out of the plane of the wall interlocked in complementary shaped notches in the edge of the abutting wall by flanges carried by the latter edge swaged over the lugs and completing the filling of the notches.

4. An electrical outlet box formed from a blank of sheet material and having a bottom, and side and end walls bent up from the bottom and bounding the box, the walls of the box meeting in permanent tight edged square joints, the opposite walls having similar lateral edges, one pair of opposite walls having a series of lugs on the lateral edges struck to project partially out of the plane thereof into the plane of the abutting wall, the other pair of walls having scalloped lateral edges forming notches to receive the lugs and swaged over the lugs to form the square edged joints.

5. An electrical outlet box formed from a metal blank and having a bottom, and side and end walls bent up from the bottom and bounding the box, where the walls meet in permanent tight edged joints formed by notches in the edge of one wall receiving lugs carried on the edge of the abutting wall, a portion of the surface of each lug projecting out of the plane of the surface of the wall on which the lug is carried, the notches being shaped complementary to the lugs so that said projecting surface portion of each lug lies below the margin of the notched edge, the joint being locked by the margin of the notched edge swaged even over the said projecting surface portion of the lugs so as to complete the filling of the notches, such that a smooth, square corner is formed.

6. An electrical outlet box having a bottom, and side and end walls bent up from the bottom and bounding the box, where the walls meet in permanent tight edged joints formed by notches in the edge of one wall receiving lugs on the edge of the abutting wall, the lugs having a portion projecting out of the plane of the said abutting wall and the notches having a deeper portion for receiving the said projecting portion of the lugs, the joint being locked by the margin of the edge of said abutting wall swaged even so as to complete the filling of the notches over the said projecting portions of the lugs lying in the deeper portions of the notches such that a smooth, square corner is formed.

References Cited in the file of this patent
UNITED STATES PATENTS

| | | |
|---|---|---|
| 595,494 | O'Meara | Dec. 14, 1897 |
| 2,714,519 | Hill | Aug. 2, 1955 |